J. H. BROWN.
LEVEL.
APPLICATION FILED JULY 3, 1915.
1,187,249.
Patented June 13, 1916.
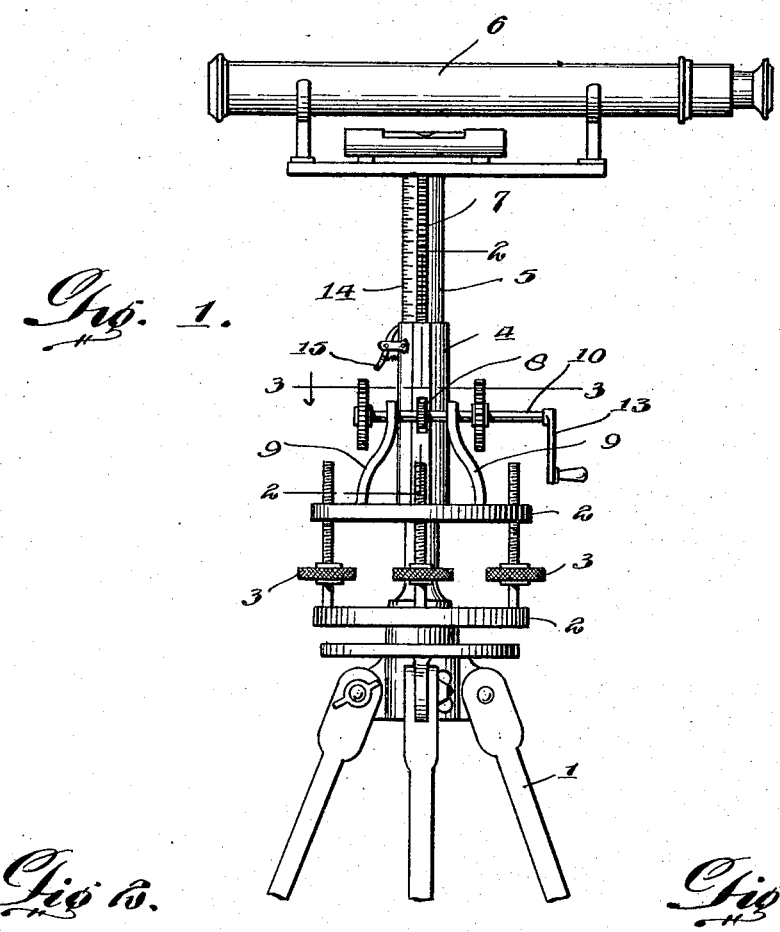
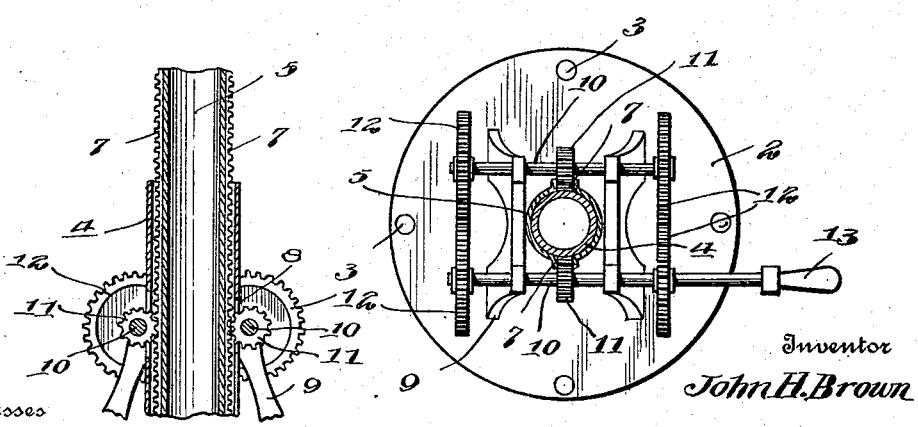
Witnesses
Frederick L. Fox,
John J. McCarthy
Inventor
John H. Brown
By Victor J. Evans.
Attorney

UNITED STATES PATENT OFFICE.

JOHN H. BROWN, OF HOMER, GEORGIA.

LEVEL.

1,187,249.　　　　Specification of Letters Patent.　　Patented June 13, 1916.

Application filed July 3, 1915.　Serial No. 37,895.

*To all whom it may concern:*

Be it known that I, JOHN H. BROWN, a citizen of the United States, residing at Homer, in the county of Banks and State of Georgia, have invented new and useful Improvements in Levels, of which the following is a specification.

This invention relates to certain novel and useful improvements in levels.

In carrying out the present invention it is my purpose to provide a level wherein the telescope may be adjusted vertically to any desired position independently of the leveling screws and the tripod, thereby eliminating the necessity of manipulating the leveling screws or disturbing the legs of the tripod after the tripod has been properly placed.

It is also my purpose to provide an adjustable connection between the telescope and the upper leveling plate which will embrace the desired features of simplicity, efficiency and durability, and which may be operated quickly and conveniently to bring the telescope to the desired position.

With the above recited objects in view and others of a similar nature, the invention resides in the construction, combination and arrangement of parts set forth herein and falling within the scope of the appended claims.

In the accompanying drawings Figure 1 is a fragmentary side elevation of a level constructed in accordance with my present invention; Fig. 2 is a vertical sectional view on the line 2—2 of Fig. 1; and Fig. 3 is a cross sectional view on the line 3—3 of Fig. 1.

Referring now to the drawing in detail, 1 designates a tripod of any approved construction, 2, 2 designate the leveling plates of the level spaced apart in parallelism and 3 indicates the leveling screws whereby the upper leveling plate may be moved relatively to the lower plate.

Secured to the upper leveling plate approximately centrally thereof and upstanding therefrom is a tube 4 and disposed within the tube 4 and capable of movement relatively thereto is a second tube 5 having the upper end thereof projecting above the tube 4, and mounted upon the upper end of the tube 5 is the telescope 6 and associated parts of the level. Formed on the inner tube 5 at diametrically opposite points are longitudinally extending rows of rack teeth 7 registering with slots 8 formed in the outer tube 4. Uprising from the upper leveling plates are standards 9 and journaled in the upper ends of the standards are shafts 10 disposed at the opposite sides of the tube 4 and adjacent to the respective slots 8. Keyed upon the shafts 10 are pinions 11 meshing with the rack teeth 7 in the respective rows, while fast upon the ends of each shaft 10 are pinions 12 meshing with the pinion on the other shaft. One shaft 10 is relatively long as compared with the length of the other shaft and has the outer end thereof equipped with a crank handle 13 whereby the shafts 10 may be rotated. Formed on the outer surface of the inner tube 5 is a longitudinally extending row of notches 14, while pivotally connected to the outer side of the tube 4 adjacent to the upper end thereof is a latching dog 15 adapted to engage in the notches 14 to hold the telescope in adjusted position succeeding the turning of the shaft 10.

In practice, the legs of the tripod are secured in position and the leveling screws manipulated for the usual well known purpose. When it is desired to adjust the telescope vertically after the tripod legs have been fixed and the leveling screws operated, the crank handle 13 is rotated, thereby revolving the shaft 10 connected with such crank handle and the pinion shaft through the medium of the pinions 12. In the rotation of the shaft 10 the pinions 11, meshing with the rack teeth 7, slide the tube 5 relatively to the tube 4. During the movement of the shafts 10 the locking dog 15 is withdrawn from engagement with the notched portion of the tube 5, and after the telescope has reached the desired elevation under the action of the shafts 10, the dog is released and enters the adjacent notch in the row 14, thereby locking the sections 4 and 5 against accidental relative movement.

While I have herein shown and described certain forms of my invention by way of illustration, I wish it to be understood that I do not limit or confine myself to the precise details of construction herein described, as modifications and variations may be made within the scope of the claims and without departing from the spirit of the invention.

Having thus described my invention, I claim:

1. In a level, a telescope, leveling plates spaced apart one above the other, leveling screws interconnecting said plates and operable to move the plates toward and away from each other, a tripod secured to the bottom plate, telescoping tubes connecting the upper leveling plate to said telescope whereby the latter may be adjusted vertically independently of the leveling screws and the tripod, and rack and pinion mechanism for adjusting said telescoping tubes.

2. In a level, a telescope, leveling plates spaced apart one above the other, leveling screws interconnecting said plates and operable to move the plates toward and away from each other, a tripod secured to the bottom plate, telescoping tubes connecting the upper leveling plate to said telescope whereby the latter may be adjusted vertically independently of the leveling screws and the tripod, rack teeth formed on the upper tube, pinions meshing with said teeth, shafts carrying said pinions, and means for rotating said shafts to move the upper tube relatively to the lower tube.

3. In a level, a telescope, leveling plates spaced apart one above the other, leveling screws interconnecting said plates and operable to move the plates toward and away from each other, a tripod secured to the bottom plate, telescoping tubes connecting the upper leveling plate to said telescope whereby the latter may be adjusted vertically independently of the leveling screws and the tripod, rack teeth formed on the upper tube, pinions meshing with said teeth, shafts carrying said pinions, means for rotating said shafts to move the upper tube relatively to the lower tube, and means carried by the outermost tube and engageable with the innermost tubes to lock the upper tube to the lower tube.

In testimony whereof I affix my signature in presence of two witnesses.

JOHN H. BROWN.

Witnesses:
 OSCAR BROWN,
 J. N. HILL.

Copies of this patent may be obtained for five cents each, by addressing the "Commissioner of Patents, Washington, D. C."